Nov. 18, 1924.  
G. W. LAPP  
1,515,864  
METHOD OF TESTING INSULATORS  
Filed July 7, 1922  
2 Sheets-Sheet 1
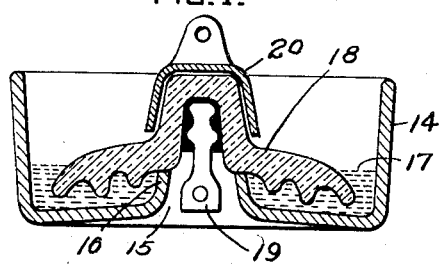
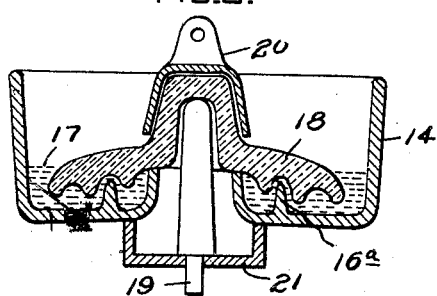
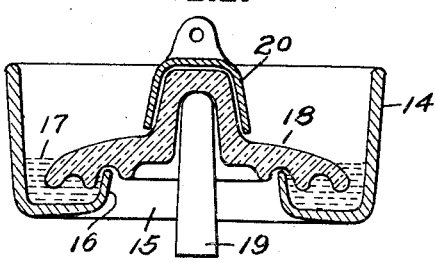
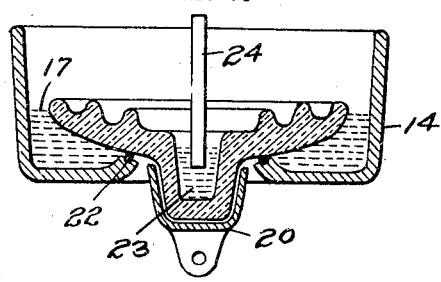
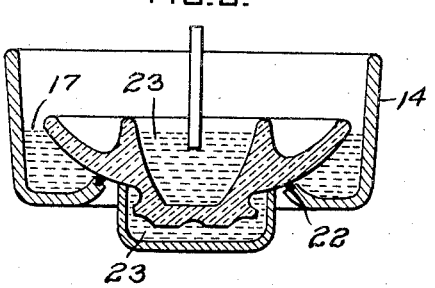
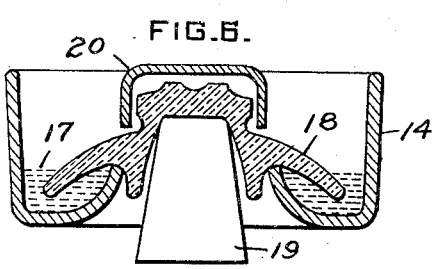
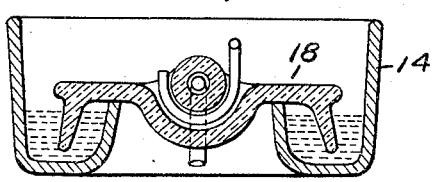
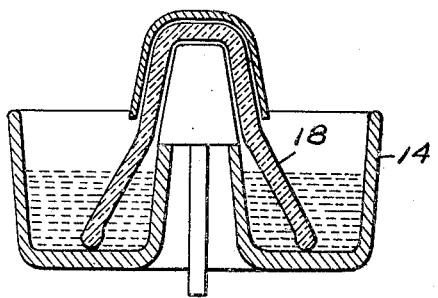
WITNESSES  
J. Herbert Bradley.
INVENTOR  
Grover W. Lapp.  
by Grant McCallister  
his attorneys in fact.

Nov. 18, 1924.

G. W. LAPP 1,515,864

METHOD OF TESTING INSULATORS

Filed July 7, 1922 2 Sheets-Sheet 2

WITNESSES

INVENTOR

Patented Nov. 18, 1924.

1,515,864

UNITED STATES PATENT OFFICE.

GROVER W. LAPP, OF LE ROY, NEW YORK.

METHOD OF TESTING INSULATORS.

Application filed July 7, 1922. Serial No. 573,411.

(DEDICATED TO THE PUBLIC.)

*To all whom it may concern:*

Be it known that I, GROVER W. LAPP, a citizen of the United States, and a resident of Le Roy, in the county of Genesee and the State of New York, have made a new and useful Invention in Method of Testing Insulators, of which the following is a specification.

This invention relates to an improved method of testing insulators used in supporting electrical conductors and particularly to a method of testing high tension porcelain insulators, although it is applicable in general to the testing of insulators constructed of other materials.

An object of the invention is to provide a method of testing the dielectric strength of insulators in which the test conditions cannot only be accurately ascertained but can be duplicated, so that a standard of dielectric strength and of insulator quality may be established on a sound or definite basis.

With the present trend in the electrical industry, increasing responsibility is being placed on transmission line insulators and it is, therefore, becoming more and more necessary to determine, before the insulators are placed in service, that each insulator has a liberal initial factor of safety and will not deteriorate in service. Permanent high dielectric strength is a fundamental requirement, but this is not an independent factor in the determining of the soundness of insulators. The flash-over voltage of the insulator, the shell thickness and the impulse ratio must all be considered in determining the factor of safety. The ratio of puncture voltage to the product of flash-over voltage times impulse ratio may be taken as an electrical factor of safety in service. This factor of safety may be increased by a higher dielectric strength and by lower flash-over voltage, but the impulse ratio is rarely utilized as an independent variable in designing insulators. By the term "flash-over voltage", I mean that voltage required to cause a spark or arc to pass through the air between the service terminals of a dry insulator.

The routine electrical test now depended upon to weed out poor or defective insulators consists in subjecting the insulator to flash-over voltage for a determined period of time. In actual use, the insulator may be subjected to a higher potential than the flash-over voltage and, in addition, some insulators that pass the flash-over test have inherent weaknesses which cause them to fail when subjected to a flash-over voltage for a long period of time. It, however, has been found that in testing insulators, the application of the flash-over tests for longer than a few minutes produces but few additional punctures or failures, and consequently, attention has been devoted to increasing the test voltage.

The most obvious and the most general method of applying higher potentials to insulators is to immerse them in oil as in puncture testing. This has never become a routine test on insulators because of its many disadvantages. The application of the full potential is limited to areas of the insulator actually in contact with the conducting medium, because of the low dielectric constant and high dielectric strength of the oil. This restriction localizes and intensifies the dielectric flux to such an extent that damage may be done to a sound or satisfactory insulator. In addition, it cannot be relied upon to detect defects in the insulator, which may be somewhat removed for the point of application of the potential stress. The high frequency and the impact tests are also employed but both of these are faulty in that they merely indicate rather than verify conditions.

A further object of the invention is, therefore, to provide a method of testing insulators which will disclose insulators of doubtful dielectric strength and one which may be employed under practical testing conditions for the purpose of insuring that insulators installed on the transmission lines have a factor of safety well above the maximum service requirements of flash-over in service.

This is accomplished by preventing the free flash-over around the edge of the insulator even when the insulator is subjected to potentials well above the flash-over potential.

In practicing my method of testing insulators, I, in effect, temporarily extend the surface of the insulator by supplementing it with an insulating member and by sealing the joint between the insulator and the member with oil or other suitable material so as to provide a sufficient flash-over seal but at the same time leave the vital central part of the insulator exposed to air so as to obtain a condition in which the insulator is bathed in an active corona, which diffuses electrostatic stress over the exposed surface and prevents undue local concentration and local heating.

In testing, I preferably employ a dish or vessel constructed of insulating material for extending the flash-over path of the insulator. The dish is adapted to hold a sufficient depth of oil to form an effective flash-over seal at the rim of the insulator but at the same time to leave the head and inner or lower central part of the insulator shell exposed to the air. The lower terminal of the insulator is connected to a conductor passing up through the center of the dish or vessel. The dish or vessel, in effect, becomes a part of the insulator and, therefore, the insulator temporarily, for testing purposes, acquires an extended flash-over distance, sufficiently long to prevent flash-over at the determined testing voltage.

Under such conditions, the insulator may be subjected to an over-potential without being damaged by local concentration, local heating or mechanical grooving and pitting encountered in the puncture under oil test and the high frequency test. In addition, the specific test voltage can be maintained at a constant value, since flash-over at determined voltages can be avoided. This makes it possible to apply to the insulator under test an accurately determined voltage of approximately sine wave characteristic.

The importance of applying low frequency may be gained from observations of the effects of the high frequency tests. It appears that the energy per half cycle of the damped high frequency wave, employed in high frequency tests, is not sufficient to supply the energy required by dielectric hysteresis and to overcome the counter electromotive force, due to the time lag of the dielectric in giving up charge, except at the surface of the insulator which is in immediate contact with the rapidly reversing potential. This is borne out by the fact that continuous waves of the same order of frequency heat the dielectric much more rapidly than the damped wave trains of the high frequency test and also by the fact that the high frequency test occasions a piece-meal destruction from the surface of the insulator and accomplishes puncture only by a process of progressive destruction.

One of the distinctive features of my new over-potential test is that, while the normal flash-over distance is extended temporarily for test purposes, the normal distribution of electrical stresses through the medium of air at the center of the insulator is preserved. Another valuable feature is that the dielectric strength of the insulator can be proven and a minimum factor of safety established at any reasonable value above the voltage of flash-over of the insulator.

In the drawings accompanying and forming a part hereof, I have illustrated various ways of employing the test embodying my invention.

Figure 1 is a sectional elevation disclosing a typical suspension insulator assembled with cap and pin for final test and located in a testing vessel such as I have employed in carrying out my invention.

Figure 2 is a view similar to Fig. 1, except that the cap and pin are temporarily in place on the porcelain shell of the insulator.

Fig. 3 is a view similar to Fig. 1, but illustrating a testing vessel adapted to leave the under center of the insulator more freely exposed to the distribution of potential stress by means of corona formation.

Figs. 4 and 5 are sectional views of insulators and testing vessels in which the insulator is inverted in the vessel and the insulating liquid is retained in the vessel by means of suitable packing material employed between the inner edge of the flange 16 and the adjacent surface of the insulator.

Figure 5 differs from Fig. 4 in that it illustrates an insulator of different shape and a method of employing conducting liquid at both terminals of the insulator.

Figs. 6, 7 and 8 illustrate apparatus for employing my improved method of testing in connection with types of insulators differing somewhat from those illustrated in other figures.

Figure 9:
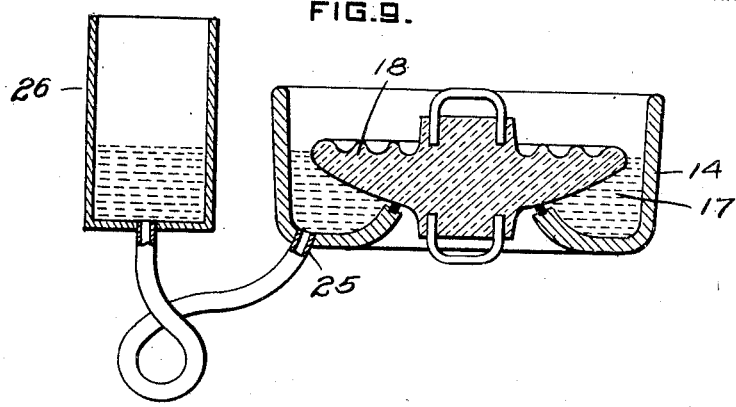

Fig. 9 diagrammatically illustrates means for varying the height of insulating liquid and consequently the surface of the insulator exposed to the air or to the formation of the active corona.

Figure 10:
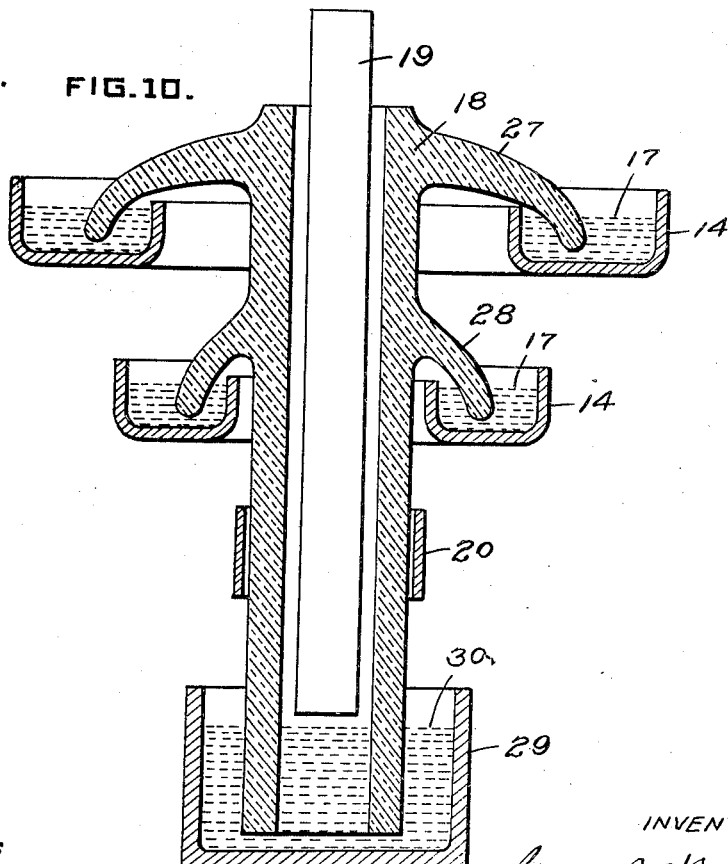

Fig. 10 illustrates a method of employing my invention in testing insulators having several flanges or skirts.

As illustrated in the drawings, the flash-over surface of the insulator to be tested is temporarily extended by means of a dish or vessel and the joint between the insulator and the dish or vessel is sealed by liquid or other material to such an extent as to provide an effective flash-over seal. In Fig. 1, the temporary extension surface consists of a dish 14 provided with a central aperture 15 which is provided with an annular flange 16 which projects upwardly. The annular space between the flange 16 and the edge of the dish contains a dielectric fluid, such as oil 17, and an insulator 18 is supported on the flange 16 in such a way that its terminal pin 19 projects downwardly through the aperture 15 and the lower edges of its skirt and petticoat project into the liquid. With this arrangement, the terminal cap 20 and substantially the entire upper surface of the insulator are exposed to the air. In addition to this, the lower portion or inside portion of the insulator and the lower or inner terminal are also exposed to the air. In addition, the insulator may be so placed in the oil as to maintain air pockets above the surface of the oil confined by each of the petticoats. Under such conditions, substantially the entire upper surface of the insulator is subjected to uniform potential distribution occasioned by the formation of an active corona and the same condition exists to a large extent in connection with the lower surface of the insulator. As a result, the application of an over-potential causes the air adjacent to the terminals and to the insulator to become ionized and the active corona resulting supplements the terminals in diffusing the electrostatic stress over the entire surface of the insulator exposed to the air and prevents undue local application and undue local heating.

In Figure 2, I have illustrated an insulating member 21 which may be employed as a support for elevating the test apparatus. I have also illustrated a barrier 16a for confining the oil to the outer portion of the dish, so that the surface of the insulator exposed to the air is materially extended.

In Fig. 3, the vessel 14 is so formed that the area of the bottom portion of the insulator exposed to the air is also materially extended. This is accomplished by increasing the diameter of the aperture 15 and so forming the flange 16 that it extends into the space between two of the petticoats with which the insulator is equipped. In other respects the apparatus is similar to that illustrated in Fig. 1 except that the terminals are not permanently secured to the insulator.

In Fig. 4, I have shown a vessel 14 adapted to receive an inverted insulator and also adapted to maintain an oil seal 17 above the joint between the dish and the insulator. As illustrated in Fig. 1, the vessel is provided with the central aperture 15 but the flange 16 surrounding the aperture is modified so as to more effectively conform to the contour of the top of the inverted insulator and a suitable packing material 22 is employed for retaining the oil at the desired level within the dish 14. This packing, together with the oil, may form the flash-over seal between the insulator and the dish. In this view I have also illustrated the pin socket of the insulator partially filled with conducting liquid 23 and a terminal pin 24 extending into this liquid.

Fig. 5 is similar to Fig. 4, except that a conducting liquid 23 is employed for both terminals of the insulator.

Figs. 6, 7 and 8 are views similar to Fig. 1, except that in each of them the dish 14 is so shaped as to readily adapt it to the reception of an insulator of a particular shape.

Fig. 9 is a view similar to Fig. 4 in so far as the dish 14 and the insulator 18 are concerned. I have, however, diagrammatically illustrated means which may be employed for readily varying the height of the liquid 17 within the dish and consequently the extent of the surface of the insulator exposed to the air. As shown, the dish 14 is provided at a point in its bottom with an aperture 25 which is connected by means of a flexible conduit with a container 26 which may be moved to different levels for the purpose of withdrawing liquid from or supplying liquid to the interior of the dish 14.

Fig. 10 illustrates an insulator provided with two flanges 27 and 28 in which a separate dish 14 is employed in connection with each flange. As shown, each dish 14 is partially filled with sealing liquid 17 into which the edge of one of the flanges projects and the flash-over distance of each flange is, therefore, temporarily increased. As shown, the terminal pin 19 extends downwardly through the interior of the insulator and the terminal ring 20 extends around the insulator at a point intermediate its ends so that the flanges 27 and 28 intervene between the two terminals. The insulator illustrated is of the type employed in connection with transformers and cable entrances and consequently I employ a vessel 29 partially filled with insulating fluid, such as oil 30, in which the end of the bushing or insulator projects. This is for the purpose of approximating operating conditions, since insulators of this type project into the oil-filled containers such as transformer cases, etc. It has been old to employ a vessel similar to the vessel 29 and in the relation shown in Fig. 10, but only for the purpose of making it possible to apply the routine flash-over test to the insulator. In other words, it has been old to employ a vessel 29 partially filled with oil for the purpose of approximating conditions encountered in actual service but such vessels have never been employed for the purpose of extending the normal flash-over air-exposed surface of the insulator. With the arrangement of the dishes 14 shown in Fig. 10, in which the flash-over distance of each flange of the insulator is increased, the electrostatic stresses may be distributed in proportion to the service requirements at normal flash-over or to concentrate the dielectric stress at any desired point and at any desired intensity for test purposes.

It will be apparent that insulators composed of a number of shells may be subjected to my improved over-potential test after they are assembled by providing each skirt or petticoat with a temporary extension surface such as illustrated in connection with the flanges 27 and 28 of Fig. 10.

In conducting tests embodying my invention, I may employ an arrangement of conductors similar to that employed in conducting the routine flash-over test, it being understood, of course, that each insulator subjected to the test is equipped with an insulating member so as temporarily to extend its flash-over surface.

The dishes 14 with the sealing fluid and the insulators, to be tested, in place in them, are placed on the test racks and the terminals of the insulators are connected up to the high potential leads as is usual. I, however, preferably employ a fourth inch gap in series with each insulator. As long as the insulators are intact these gaps show violet color during the test but if an insulator punctures, thereby drawing current, the gap shows the characteristic yellow power arc.

Although I prefer to employ my method of testing without flash-over, it is not essential to prevent flash-over and my overpotential test may be employed in connection with other commercial tests, such as the "high frequency" oscillator test or the "impact" test, the intensity of which has been limited by the free flash-over voltage of the insulator under test. In addition to this, by employing my method of restricting free flash-over at the insulators, the flash-over can be governed so that it will occur at a spark gap set for any desired limit. The test voltage can therefore be maintained at a constant value by holding a fixed voltmeter reading showing the potential impressed upon the primary of the testing transformer. This value can also be verified accurately at intervals by checking against the spark gap without encountering the disturbing surges that accompany calibration with parallel flash-over. Either the sphere gap or the needle gap can be employed to calibrate the test without the discrepancies usually attendant where the flash-over voltage is determined by means of these two gaps.

The advantages of my method of testing are that with it a definite standard of dielectric strength may be established on a sound basis since testing conditions can be duplicated and all the electrical factors entering into the destruction of an unsound or faulty insulator are accurately known. The margin of dielectric strength or the potential stress applied to the insulator during test may be fixed at as high a value as experience proves necessary to eliminate material unreliable as a dielectric. In addition to this, the tests may be so conducted that all portions or substantially all portions of the insulator are subjected to over-potential stress and as a result defects occasioned by the material employed or the design of the insulator will be made apparent before the insulators are actually installed in service. It is absolutely impossible with the present routine flash-over test to eliminate more than a small percentage of faulty insulators; and the puncture under oil, high frequency and impact tests localize the potential stresses to such an extent that even though the insulators pass these tests there is no certainty that they are sound or satisfactory insulators, since the flux is likely to be too weak out at the flanges of the insulator to allow puncture through defects which should fail.

Another important feature of my invention is that by eliminating flash-over, at the free flash-over voltage of the insulator, the indeterminate effects occurring in connection with the "high frequency" and the "impact" tests are eliminated. In addition, it is possible to apply to the insulators an accurately determined voltage, in excess of the flash-over voltage and of constant frequency and approximately sine wave characteristics, while the surface of the insulator around and adjacent to one or both of the terminals is exposed to air and to the active corona which forms under such conditions.

With my improved test, substantially the entire insulator is subjected to potential stresses proportional to those encountered in actual service, although in excess of those occasioned by the free flash-over voltage; consequently, it is assured that defective insulators will not pass the test, even though the defects occur out on the skirts or flange of the insulator.

I claim as my invention:

1. A method of testing insulators, which consists in temporarily extending the flash-over distance of the insulator, and subjecting the insulator to a dielectric stress occasioned by a voltage in excess of the normal flash-over voltage of the insulator.

2. A method of testing insulators, which consists in increasing the flash-over distance of the insulator by temporarily extending the flash-over distance between the service terminals of the insulator, and then subjecting the insulator to a potential in excess of the free flash-over voltage of the insulator.

3. A method of testing insulators, which consists in temporarily extending the flash-over distance between the service terminals of the insulator by supplementing the insulator surface with an insulating member and employing a flash-over seal between said member and said insulator, and then subjecting the insulator to a potential in excess of the normal flash-over voltage of the insulator.

4. A method of testing insulators, which consists in extending the normal flash-over distance between the terminals of the insulator, then subjecting the insulator to a potential in excess of the normal flash-over voltage of the insulator, and applied to the insulator terminals while the surface of the insulator adjacent each terminal is exposed to the air.

5. A method of testing insulators which consists in subjecting the insulator to a dielectric stress of several minutes duration and in excess of the stress occasioned by the normal flash-over voltage of the insulator, and in exposing the surface of the insulator adjacent to at least one of the insulator terminals to the air for the purpose of preventing undue localization of the stress during the period of application.

6. A method of testing insulators which consists in subjecting an insulator to a substantially constant value of alternating stress of appreciable duration, and in excess of the stress occasioned by the normal flash-over voltage by applying a low frequency potential to the terminals of the insulator.

7. A method of testing insulators which consists in subjecting an insulator to a potential stress in excess of the stress occasioned by the normal flash-over voltage of the insulator and occasioned by a current of uniform wave characteristic.

8. A method of testing insulators which consists in subjecting an insulator to a substantially constant alternating potential continuously maintained for an appreciable period and in excess of the normal flash-over voltage of the insulator while maintaining the surface of the insulator adjacent to at least one of the terminals thereof in contact with air.

9. A method of testing insulators which consists in subjecting an insulator continuously to an electrical stress of appreciable duration, and in excess of the stress occasioned by the normal flash-over voltage of the insulator by subjecting the terminals of the insulator to continuous electrical waves of the same order of frequency while maintaining the surface of the insulator around the terminals in contact with air.

10. A method of testing insulators which consists in temporarily extending the flash-over distance between the service terminals by supplementing the insulating surface of the insulator by an insulating member electrically sealed to the insulator and then subjecting the insulator to a potential in excess of the free flash-over voltage of the insulator while maintaining at least one of the terminals of the insulator in contact with air.

11. The method of testing electrical insulators which consists in applying a temporary localized insulating medium to the surface of a given cross section only of the insulator to prevent a flashover and then subjecting the insulator to a test voltage.

12. The method of testing electrical insulators which consists in applying a temporary localized insulating medium to the surface of the rim or skirt only of the insulator to prevent a flashover, and then subjecting the insulator to a test voltage.

13. The method of testing electrical insulators which consists in applying a body of insulating oil as a temporary localized insulating medium to the surface of a given cross section only of the insulator to prevent a flashover and then subjecting the insulator to a test voltage.

14. The method of testing electrical insulators which consists in fortifying the insulator against a flashover while leaving the major portion of its surface exposed and then subjecting the insulator to a test voltage.

In testimony whereof, I have hereunto subscribed my name this 30 day of June, 1922.

GROVER W. LAPP.